United States Patent
Smiciklas et al.

(10) Patent No.: US 12,516,936 B2
(45) Date of Patent: Jan. 6, 2026

(54) APPARATUS AND METHOD FOR ENHANCED BEAT NOTE DETECTION

(71) Applicant: Honeywell International Inc., Charlotte, NC (US)

(72) Inventors: Marc Smiciklas, Phoenix, AZ (US); Chuck Croker, Glendale, AZ (US); Norman Gerard Tarleton, Glendale, AZ (US); Glen A. Sanders, Scottsdale, AZ (US)

(73) Assignee: Honeywell International Inc., Charlotte, NC (US)

( * ) Notice: Subject to any disclaimer, the term of this patent is extended or adjusted under 35 U.S.C. 154(b) by 339 days.

(21) Appl. No.: 18/453,610

(22) Filed: Aug. 22, 2023

(65) Prior Publication Data

US 2025/0067560 A1 Feb. 27, 2025

(51) Int. Cl.
*G01C 19/72* (2006.01)
(52) U.S. Cl.
CPC ......... *G01C 19/721* (2013.01); *G01C 19/723* (2013.01); *G01C 19/727* (2013.01)
(58) Field of Classification Search
CPC ... G01C 19/721; G01C 19/723; G01C 19/727
See application file for complete search history.

(56) References Cited

U.S. PATENT DOCUMENTS

| | | |
|---|---|---|
| 4,551,021 A | 11/1985 | Callaghan et al. |
| 5,355,216 A | 10/1994 | Kim et al. |
| 8,830,479 B2 | 9/2014 | Qiu et al. |
| 8,947,671 B2 | 2/2015 | Strandjord et al. |
| 9,115,994 B2 | 8/2015 | Strandjord et al. |
| 9,772,189 B2 | 9/2017 | Strandjord et al. |
| 10,837,779 B2 | 11/2020 | Strandjord et al. |
| 11,204,246 B1 | 12/2021 | Strandjord et al. |
| 2014/0211211 A1 | 7/2014 | Qiu et al. |
| 2017/0299390 A1 | 10/2017 | Schwartz et al. |
| 2021/0278215 A1* | 9/2021 | Vahala ............. H01S 3/094096 |

(Continued)

FOREIGN PATENT DOCUMENTS

| | | |
|---|---|---|
| CN | 106289223 A | 1/2017 |
| EP | 2589929 A2 | 5/2013 |
| EP | 2770298 A2 | 8/2014 |

(Continued)

OTHER PUBLICATIONS

European Patent Office, "Communication pursuant to Article 94(3) from EP Application No. 19186660.7", from Foreign Counterpart to U.S. Appl. No. 16/041,205, Jul. 20, 2020, pp. 1 through 7, Published: EP.

(Continued)

*Primary Examiner* — Michael A Lyons
(74) *Attorney, Agent, or Firm* — Fogg & Powers LLC (57) ABSTRACT

Lower noise and complexity techniques are disclosed for compensating for time varying phase changes in fiber optics in a resonant fiber optic gyroscope (RFOG). Orthogonal components derived from an electrical beat note signal and a difference between clockwise and counterclockwise resonant frequencies of an optical resonator coil of the RFOG are determined. The orthogonal products are converted to a phase which is differentiated with respect to time to obtain a beat note correction signal.

20 Claims, 4 Drawing Sheets

(56) References Cited

U.S. PATENT DOCUMENTS

2021/0333106 A1* 10/2021 Wu .................. H01S 3/0675
2021/0389128 A1* 12/2021 Strandjord ........... G01C 19/721

FOREIGN PATENT DOCUMENTS

| EP | 3106835 A1 | 12/2016 |
| EP | 3508817 A1 | 7/2019 |
| EP | 3922945 A1 | 12/2021 |

OTHER PUBLICATIONS

European Patent Office, "Communication pursuant to Article 94(3)", from EP Application No. 19186660.7, from Foreign Counterpart to U.S. Appl. No. 16/041,205, Sep. 20, 2021, pp. 1 through 7, Published: EP.

European Patent Office, "Communication pursuant to Article 94(3)", from EP Application No. 19186660.7, from Foreign Counterpart to U.S. Appl. No. 16/041,205, Dec. 17, 2020, pp. 1 through 8, Published: EP.

European Patent Office, "Communication under Rule 71(3) EPC" from EP Application No. 19186660.7, from Foreign Counterpart to U.S. Appl. No. 16/041,205, Oct. 24, 2022, pp. 1 through 46, Published: EP.

European Patent Office, "Extended European Search Report from EP Application No. 19186660.7", from Foreign Counterpart to U.S. Appl. No. 16/041,205, Dec. 19, 2019, pp. 1-8, Published: EP.

Strandjord et al, "Large Range, High Resolution Interferometer for Wide Range of Sensing Applications", U.S. Appl. No. 15/877,985, filed Jan. 23, 2018, pp. 1-43, Published in: US.

U.S. Patent and Trademark Office, "Corrected Notice of Allowability", U.S. Appl. No. 16/041,205, Oct. 5, 2020, pp. 1 through 2, Published: US.

U.S. Patent and Trademark Office, "Notice of Allowance", U.S. Appl. No. 16/041,205, Aug. 28, 2020, pp. 1 through 12, Published: US.

U.S. Patent and Trademark Office, "Office Action", U.S. Appl. No. 16/041,205, Apr. 7, 2020, pp. 1-18, Published: US.

European Patent Office, "Extended European Search Report", dated Nov. 26, 2024, from EP Application No. 24179539.2, from Foreign Counterpart to U.S. Appl. No. 18/453,610, pp. 1 through 6, Published: EP.

* cited by examiner

APPARATUS AND METHOD FOR ENHANCED BEAT NOTE DETECTION

STATEMENT REGARDING FEDERALLY SPONSORED RESEARCH OR DEVELOPMENT

This invention was made with Government support under FA9453-20-C-0013 awarded by Air Force Research Laboratory. The Government has certain rights in the invention.

BACKGROUND

Resonant fiber optic gyroscopes (RFOGs) have better signal to noise sensitivity for rotation sensing ("rotation sensitivity") for a given diameter than laser ring gyroscopes and interferometer fiber optic gyroscopes. Thus, RFOGs are desirable because a given level of rotation sensitivity can be achieved with smaller RFOGs, reducing the size of inertial navigation systems incorporating RFOGs. Rotation in RFOGs is determined by a difference of clockwise and counterclockwise resonance frequencies of a fiber ring resonator. The resonance frequencies are measured with optical signals respectively from optical sources generating clockwise and counterclockwise optical signals (respectively a clockwise optical source and a counterclockwise optical source) that are aligned with, referenced to, or locked to the resonance frequencies of the resonator. Therefore, the frequency difference of clockwise and counterclockwise optical signals at the resonator input is a measure of rotation. Conventionally, the frequency measurements of such clockwise and counterclockwise optical signals are made proximate to the clockwise optical source and the counterclockwise optical source.

Time varying optical pathlengths of the optical fibers coupling the optical sources to the optical resonator can change the frequencies of the clockwise and counterclockwise optical signals propagating through the optical fibers. This can arise due to temperature fluctuations or mechanical vibrations that cause time varying indices of refraction, and physical path-lengths, of the optical fibers which result in time varying optical phase of the optical signal propagating through the optical fibers. The optical fibers of the clockwise and counterclockwise optical signal paths can only be matched with limited precision. Thus, when pathlength fluctuations occur, the difference between the frequencies of the clockwise and counterclockwise optical signals frequencies will not be the same proximate to the optical sources and proximate to the RFOG's optical resonator. This can cause rotation rate errors, known as bias errors, if the pickoff point for measuring optical frequencies is not adequately close to the resonator input, which may be challenging. An RFOG can be designed to measure frequency differences as low as tens of Micro hertz. Thus, even very small temperature fluctuations create undesirable bias error in the RFOG.

Because the frequency measurements of the clockwise and counterclockwise optical signals are made proximate to the clockwise optical source and the counterclockwise optical source, additional bias errors can arise due to time varying electrical phenomena, such as offset voltages drifting over time and 1/f noise, in electrical circuitry in feedback loops in the RFOG. Such time varying electrical phenomena also results in the difference between the frequencies of the clockwise and counterclockwise optical signals frequencies proximate to the optical sources and those that are proximate to the RFOG's optical resonator. Therefore, there is a need to reduce this bias error.

U.S. Pat. No. 10,837,779 (hereinafter "the '779 patent") describes a technique for doing so using a phase locked loop; the '779 patent is hereby incorporated by reference herein. However, this technique is more complex, difficult to optimize, and susceptible to gain interactions producing higher noise in the beat note measurement.

SUMMARY

In some aspects, the techniques described herein relate to a method for generating a beat note correction signal configured to reduce bias error in a resonant fiber optic gyroscope including an optical source optically coupled to an optical resonator coil, wherein the optical source is configured to generate a clockwise optical signal configured to propagate clockwise around the optical resonator coil and a counterclockwise optical signal configured to propagate counterclockwise around the optical resonator coil, the method including: receiving a resonant frequency in each of a clockwise direction and a counterclockwise direction of the optical resonator coil; receiving a beat note electrical signal derived from a portion of the clockwise optical signal and a portion of the counterclockwise optical signal; determining a difference frequency which is a function of the resonant frequency in the clockwise direction of the optical resonator coil and the resonant frequency in the counterclockwise direction of the optical resonator coil; generating (a) a sine signal which is a function of the difference frequency and (b) a cosine signal which is the function of the difference frequency; digitizing the beat note electrical signal; generating a first low pass filtered signal by mixing the sine signal with the digitized beat note electrical signal and removing first set of mixing products other than a first mixing product closest to zero Hertz; generating a second low pass filtered signal by mixing the cosine signal with the digitized beat note electrical signal and removing a second set of mixing products other than a second mixing product closest to zero Hertz; using the first and the second low pass filtered signals, generating a phase signal using a rectangular to polar coordinates converter; and generating a beat note correction signal by differentiating the phase signal with respect to time.

In some aspects, the techniques described herein relate to a non-transitory machine readable medium storing data that when loaded into a programmable circuit, causes the programmable circuit to instantiate a circuit configured to generate a beat note correction signal configured to reduce bias error in a resonant fiber optic gyroscope including an optical source optically coupled to an optical resonator coil, wherein the optical source is configured to generate a clockwise optical signal configured to propagate clockwise around the optical resonator coil and a counterclockwise optical signal configured to propagate counterclockwise around the optical resonator coil, wherein the programmable circuit is further configured to: receive a resonant frequency in each of a clockwise direction and a counterclockwise direction of the optical resonator coil; receive a beat note electrical signal derived from a portion of the clockwise optical signal and a portion of the counterclockwise optical signal; determine a difference frequency which is a function of the resonant frequency in the clockwise direction of the optical resonator coil and the resonant frequency in the counterclockwise direction of the optical resonator coil; generate (a) a sine signal which is a function of the difference frequency and (b) a cosine signal which is the function of the difference frequency; digitize the beat note electrical signal; generate a first low pass filtered signal by mixing the sine signal with the digitized beat note electrical signal and removing a first set of mixing products other than a first mixing product closest to zero Hertz; generate a second low pass filtered signal by mixing the cosine signal with the digitized beat note electrical signal and removing a second set of mixing products other than a second mixing product closest to zero Hertz; using the first and the second low pass filtered signals, generate a phase signal using a rectangular to polar coordinates converter; and generate a beat note correction signal by differentiating the phase signal with respect to time.

In some aspects, the techniques described herein relate to a resonant fiber optic gyroscope (RFOG), including: an optical source including at least one laser and configured to generate a clockwise (CW) optical signal and a counterclockwise optical (CCW) signal; a beat note detector configured to receive a first portion of the CW optical signal and a first portion of the CCW optical signal, and to generate a beat note electrical signal using the first portions of the CW and the CCW optical signals; an optical resonator coil; resonator closure optics configured to couple a second portion of the CW optical signal and a second portion of the CW optical signal into the optical resonator coil, and to transmit a third portion of the CW optical signal and a third portion of the CCW optical signal from the optical resonator coil; a CW rate detector configured to convert a portion of the third portion of the CW optical signal to a CW electrical signal; a CCW rate detector configured to convert a portion of the third portion of the CCW optical signal to a CCW electrical signal; a CW resonance tracking loop circuit configured to determine a resonant frequency of the optical resonator coil in a CW direction; a CCW resonance tracking loop circuit configured to determine a resonant frequency of the optical resonator coil in a CCW direction; and a beat note corrector circuit configured to: receive the resonant frequency in each of a clockwise direction and a counterclockwise direction of the optical resonator coil; receive the beat note electrical signal; determine a difference frequency which is a function of the resonant frequency in the clockwise direction of the optical resonator coil and the resonant frequency in the counterclockwise direction of the optical resonator coil; generate (a) a sine signal which is a function of the difference frequency and (b) a cosine signal which is the function of the difference frequency; digitize the beat note electrical signal; generate a first low pass filtered signal by mixing the sine signal with the digitized beat note electrical signal and removing a first set of mixing products other than a first mixing product closest to zero Hertz; generate a second low pass filtered signal by mixing the cosine signal with the digitized beat note electrical signal and removing a second set of mixing products other than a second mixing product closest to zero Hertz; using the first and the second low pass filtered signals, generate a phase signal using a rectangular to polar coordinates converter; and generate a beat note correction signal by differentiating the phase signal with respect to time.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

To solve the aforementioned problem with less complexity, difficulty to optimize, and noise in the beat note measurement, techniques are disclosed which generate a beat note correction signal utilizing a difference of the clockwise and counterclockwise resonant frequencies of the optical resonator coil of the RFOG as a references signal. Such techniques are technological improvements to RFOGs which diminish bias errors in RFOGs due to time varying indices of refraction, and physical path-lengths, of the optical fibers.

A beat note electrical signal is received and digitized. A frequency of a clockwise optical signal and a frequency of the counterclockwise optical signal are received, and a difference of frequency of a clockwise optical signal and the frequency of the counterclockwise optical signal is generated; a difference between the frequency of a clockwise optical signal and the frequency of the counterclockwise optical signal shall be referred to as a reference frequency. Sine and cosine signals as a function of the reference frequency are generated. The sine and cosine signals are orthogonal to one another. Each of the sine and the cosine signals are mixed with the digitized beat note electrical signal, thus generating two sets of mixing products. Each set of mixing products is filtered to remove all but the mixing product closest in frequency to zero Hertz. Both filtered mixing products are converted to a difference in phase relative to the reference frequency.[1] A beat note correction signal is determined by differentiating with respect to time the difference in phase. To more accurately determine a rate of rotation of the RFOG, or resonator thereof, the difference of the frequency of a clockwise optical signal and the frequency of the counterclockwise optical signal is adjusted (or offset) by the beat note correction signal.

[1] The clockwise and counterclockwise optical signals are locked to respectively the clockwise and counterclockwise resonant frequencies.

Resonance tracking loops determine resonant frequencies of clockwise and counterclockwise paths in the optical resonator. A beat note detector generates an electrical signal which is a beat note of the clockwise and counterclockwise signals emitted from the resonator.

Figure 1:
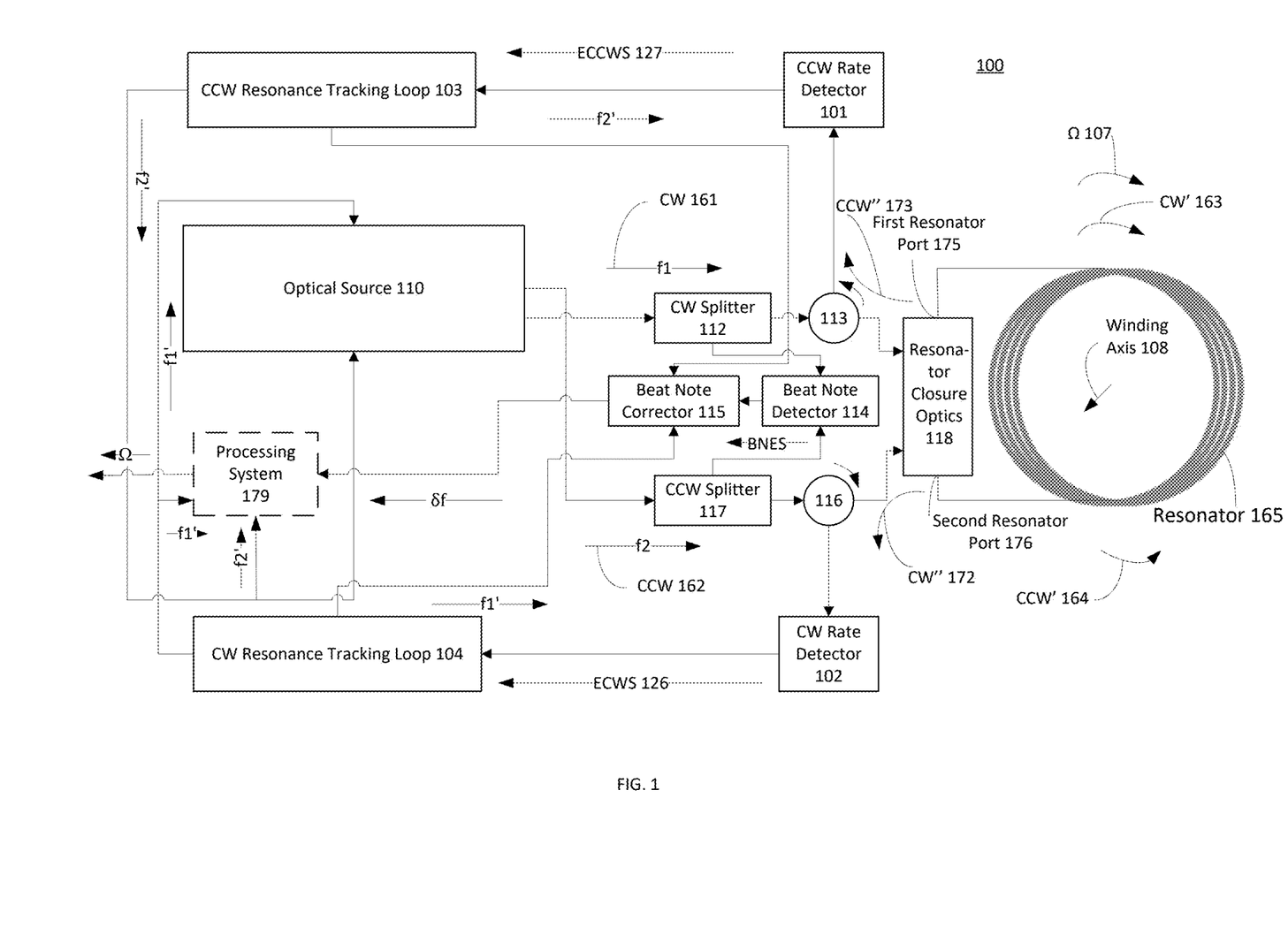
FIG. 1 illustrates a block diagram of one embodiment of an RFOG with enhanced beat note detection.

FIG. 1 illustrates a block diagram of one embodiment of an RFOG with enhanced beat note detection 100. The embodiment of FIG. 1 is but one RFOG architecture in which the present invention can be implemented, and thus is illustrated solely for pedagogical purposes.

In the illustrated embodiment, the RFOG with enhanced beat note detection (RFOG) 100 includes an optical resonator coil (or resonator) 165, resonator closure optics 118, first coupling optics 113, second coupling optics 116, a CW rate detector 102, a CCW rate detector 101, a beat note detector 114, a beat note corrector (or beat note corrector circuit) 115, a CW optical splitter (or CW splitter) 112, a CCW optical splitter (or CCW splitter) 117, a CW resonance tracking loop (or CW resonance tracking loop circuit) 104, a CCW resonance tracking loop (or CCW resonance tracking loop circuit) 103, and an optical source 110.

Optionally, the optical source 110 includes at least one laser. Optionally, when a single laser is used, an acousto-optic modulator or other frequency shifting device may be used to generate another optical signal having a carrier frequency that differs from the carrier frequency of the optical signal generated by the laser. Optionally, each detector is implemented with a photodiode.

The RFOG 100 optionally includes a processing system (or processing circuitry) 179; however, the optional processing system 179 may be external to the RFOG 100. Optionally, the beat note corrector 115 may be included in the optional processing system 179. The optional processing system 179 is configured to determine a rate of rotation (52) 107 of the RFOG 100, or its optical resonator coil 165, around a winding axis 108 of the optical resonator coil 165, e.g., the RFOG 100. The optical resonator coil 165 is comprised of turns or windings of optical fiber around the winding axis 108.

The optical source 110 is configured to provide, at a first output, a clockwise (CW) optical signal (CW, CW optical signal, or CW signal) 161 having a carrier frequency f1 and to provide, at a second output, a counterclockwise (CCW) optical signal (CCW. CCW optical signal, or CCW signal) 162 having a carrier frequency f2. Optionally, the carrier frequencies f1 and f2 may be separated by one or more free spectral ranges. A CW splitter 112 is configured to be optically coupled (e.g., by a first optical fiber) to the first output of the optical source 110 and to receive the CW optical signal 161. A CCW splitter 117 is configured to be optically coupled (e.g., by a second optical fiber) to the second output of the optical source 110 and to receive the CCW optical signal 162. The CW splitter 112 is optically coupled to the beat note detector 114 and is optically coupled, e.g., through a third optical fiber, to the first coupling optics 113, and is configured to convey a first portion of the CW optical signal 161 to the beat note detector 114 and a second portion of the CW optical signal 161 to the first coupling optics 113. The CCW splitter 117 is optically coupled to the beat note detector 114 and is optically coupled, e.g., through a fourth optical fiber, to the second coupling optics 116, and is configured to convey a first portion of the CCW optical signal 162 to the beat note detector 114 and a second portion of the CCW optical signal 162 to the second coupling optics 116. Optionally, each splitter 112, 117 may be an optical coupler, but may alternatively be another type of optical device. Optionally, each coupling optics 113, 116 may be an optical circulator, but may alternatively be another type of optical device such as an optical coupler. The beat note detector 114 is configured to generate a beat note electrical signal (BNES) based upon incident power or intensity of the first portions of the CW optical signal 161 and the CCW optical signal 162 and the phase difference between them.

For purposes of clarity, a portion of the CW optical signal 161 and a portion of the CCW optical signal 162 optically coupled to the beat note detector 114 may be obtained from the optical resonator coil 165, the resonator closure optics 118, or (as illustrated in FIG. 1) from a portion of the RFOG 100 between the optical source 110 and the resonator closure optics. Optionally, the portion of the CW optical signal 161 and the portion of the CCW optical signal 162 optically coupled to the beat note detector 114 at the optical resonator coil 165 or as close to the optical resonator coil 165 as practical.

Figure 2:
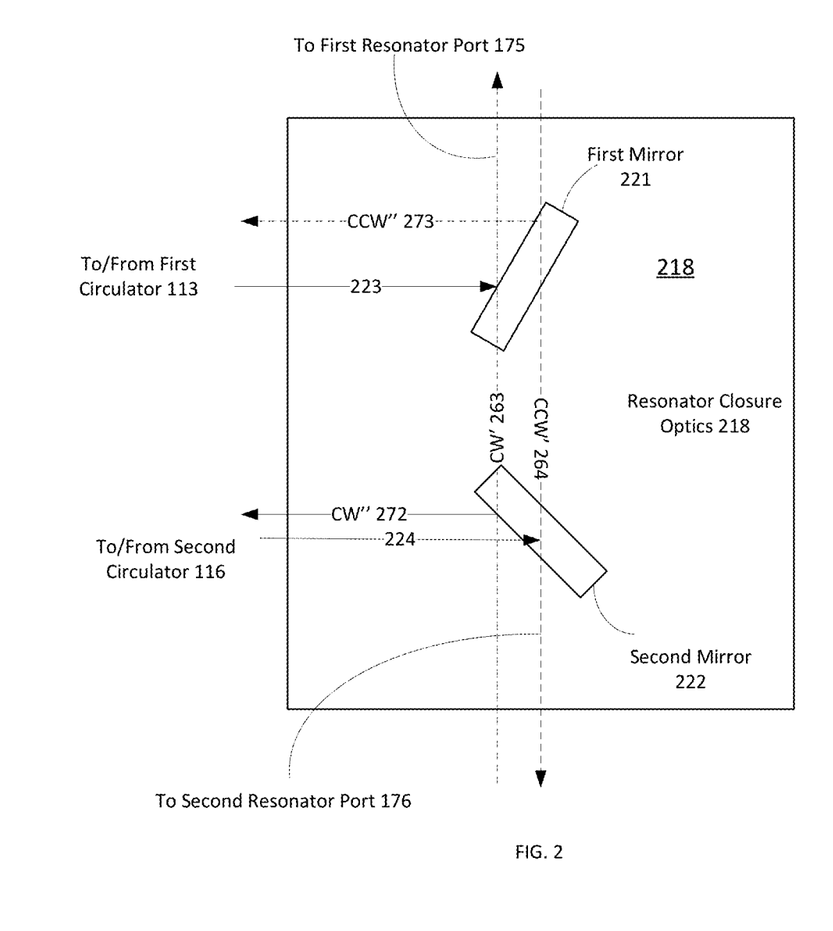
FIG. 2 illustrates a block diagram of one embodiment of resonator closure optics.

FIG. 2 illustrates a block diagram of one embodiment of the resonator closure optics 218. The resonator closure optics 218 include a first optical mirror (or first mirror) 221 and a second optical mirror (or second mirror) 222. The first optical mirror 221 is configured to receive the second portion 223 of CW optical signal 161, and optically couple, e.g., reflect, a portion thereof, the third portion (CW') 263, to the optical resonator coil 165, e.g., through the first resonator port 175. The first optical mirror 221 is further configured to optically couple, to the first coupling optics 113, a portion (i.e., the fourth portion (CCW")  273) of the second portion (CCW') 264 which is circulating counter-clockwise around the optical resonator coil 165.

The second optical mirror 222 is configured to receive the second portion 224 of CCW optical signal 162, and optically couple, e.g., reflect, a portion thereof, the third portion (CCW') 264, to the optical resonator coil 165, e.g., the second resonator port 176. The second optical mirror 222 is further configured to optically couple, to the second coupling optics 116, a portion (i.e., the fourth portion (CW") 272) of the third portion (CW') 263 which is circulating clockwise around the optical resonator coil 165.

Returning to FIG. 1, the first coupling optics 113 is configured to optically couple the second portion 223 of the CW optical signal 161 to, e.g., a third port of, the resonator closure optics 118. The second coupling optics 116 is configured to optically couple the second portion 224 of the CCW optical signal 162 to, e.g., a fourth port of, the resonator closure optics 118. The optical resonator coil 165, e.g., first and second resonator ports thereof, is configured to be optically coupled to the resonator closure optics 118, e.g., respectively first and second ports of the resonator closure optics 118.

A portion of the second portion 223 of CW optical signal 161 (or a third portion (CW') 163 of the CW optical signal 161) is optically coupled from the resonator closure optics 118 to the optical resonator coil 165, e.g., through the first resonator port 175. The third portion (CW') 163 travels clockwise around the optical resonator coil 165 and the winding axis 108.

A portion of the second portion 224 of the CCW optical signal 162 (or a third portion (CCW') 164 of the CCW optical signal 162) is optically coupled from the resonator closure optics 118 to the optical resonator coil 165, e.g., through the second resonator port 176. The third portion (CCW') 164 portion travels counterclockwise around the optical resonator coil 165 and the winding axis 108.

The CW rate detector 102 is optically coupled to the second coupling optics 116. A portion of the fourth portion (CW") 172 is optically coupled from the resonator closure optics 118 to the second coupling optics 116. All or a portion of the fourth portion (CW") 172 is optically coupled from the second coupling optics 116 to the CW rate detector 102. For pedagogical purposes, all of the fourth portion (CW") 172 is illustrated as being coupled to the CW rate detector 102. The CW rate detector 102 is configured to generate an electrical CW optical signal (ECCWS) 126) based upon incident power or intensity of a portion of CW" 172 and can be used to detect an optional common modulation frequency (modulated on the CW optical signal 161) that dithers the frequency, f1, of the CW optical signal 161. The optional common modulation frequency may be used to find a resonance frequency of the optical resonator coil 165 in the CW direction.

The CCW rate detector 101 is optically coupled to the first coupling optics 113. A portion of the fourth portion (CCW") 173 is optically coupled from the resonator closure optics 118 to the first coupling optics 113. All or a portion of the fourth portion (CCW") 173 is optically coupled from the first coupling optics 113 to the CCW rate detector 101. For pedagogical purposes, all of the fourth portion (CCW") 173 is illustrated as being coupled to the CCW rate detector 101. The CCW rate detector 101 is configured to generate an electrical CCW optical signal (ECCWS) 127) based upon incident power or intensity of a portion of CCW" 173 and can be used to detect an optional common modulation frequency (modulated on the CCW optical signal 162) that dithers the frequency, f2, of the CCW optical signal 162. The optional common modulation frequency may be used to find a resonance frequency of the optical resonator coil 165 in the CCW direction.

The CW rate detector 102 is electrically coupled to the CW resonance tracking loop (or CW resonance tracking loop circuit) 104 and is configured to generate an electrical CW optical signal (ECWS) 126 provided to the CW resonance tracking loop 104. Using the ECWS 126, the CW resonance tracking loop 104 determines a resonant frequency in the CW direction (f1') of the optical resonator coil 165. The CW resonance tracking loop 104 is electrically coupled to the optical source 110 and the beat note corrector 115, and is configured to provide an electrical signal representative of the resonant frequency in the CW direction (f1') to the optical source 110 and the beat note corrector 115. The optical source 110 is configured to use the electrical signal representative of the resonant frequency in the CW direction (f1') to adjust the frequency f1 of the CW optical signal 161 to equal the resonant frequency in the CW direction f1'.

The CW resonance tracking loop 103 is further configured to be electrically coupled to the processing system 179 and to provide the electrical signal representative of the resonant frequency in the CW direction (f1') to the processing system 179.

The CCW rate detector 101 is electrically coupled to the CCW resonance tracking loop (or CCW resonance tracking loop circuit) 103 and is configured to generate an electrical CCW optical signal (ECCWS) 127 provided to the CCW resonance tracking loop 103. Using the ECCWS 127, the CCW resonance tracking loop 103 determines a resonant frequency of in the CCW direction (f2') of the optical resonator coil 165. The CCW resonance tracking loop 103 is electrically coupled to the optical source 110 and the beat note corrector (or beat note corrector circuit) 115, and is configured to provide an electrical signal representative of the resonant frequency in the CCW direction (f2') to the optical source 110 and the beat note corrector 115. The optical source 110 is configured to use electrical signal representative of the resonant frequency in the CCW direction (f2') to adjust the frequency f2 of the CCW optical signal 162 to equal the resonant frequency in the CCW direction f2'. The CCW resonance tracking loop 103 is further configured to be electrically coupled to the optional processing system 179 and to provide the electrical signal representative of the resonant frequency in the CCW direction (f2') to the optional processing system 179.

The beat note corrector 115 is configured to generate a beat note correction signal δf, and is optionally configured to generate a beat note radius monitor signal. The beat note corrector 115 utilizes an open loop implementation which is less complicated to implement than the closed loop implementation of the '779 patent.

Figure 3:
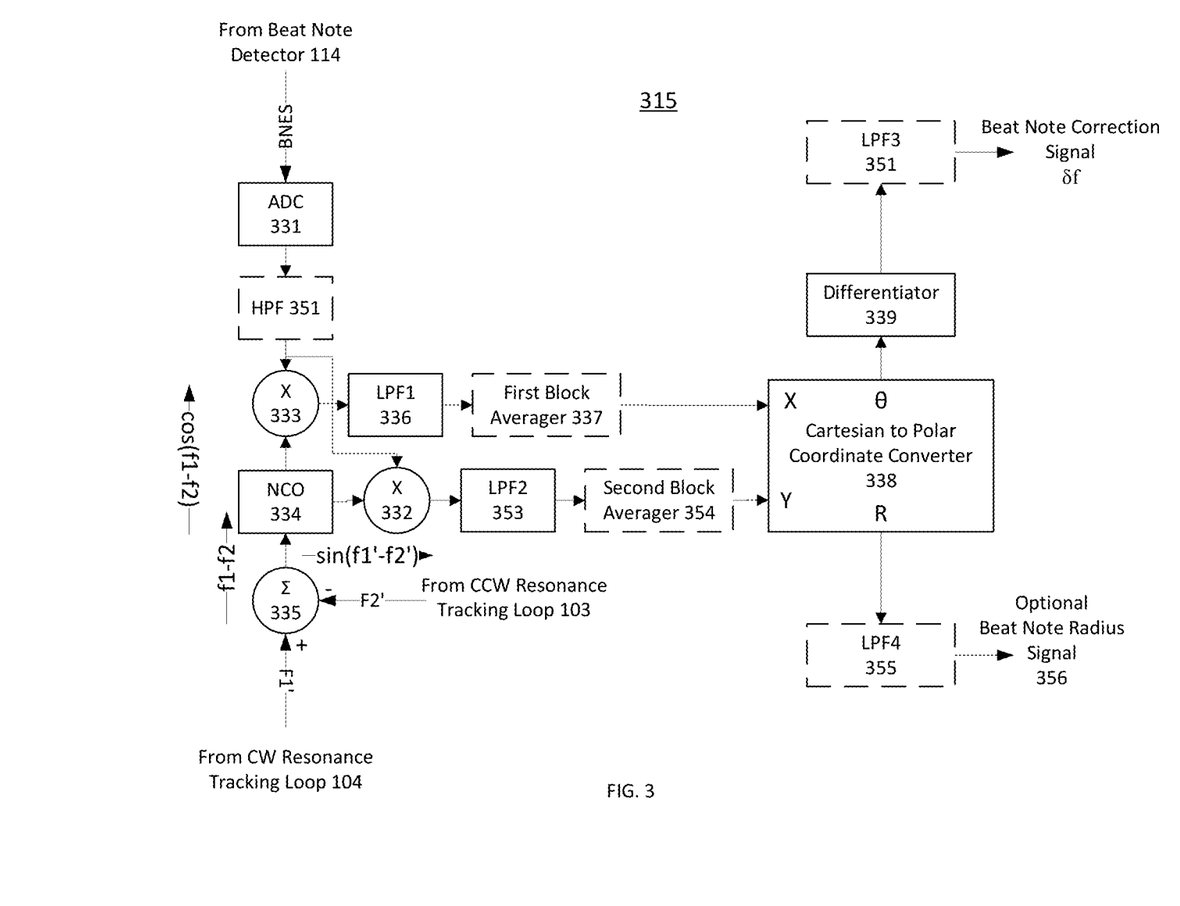
FIG. 3 illustrates a block diagram of one embodiment of a beat note corrector.

FIG. 3 illustrates a block diagram of one embodiment of the beat note corrector 315. The beat note corrector 315 includes a subtractor 335, a numerically controlled oscillator (NCO) 334, a first multiplier 332, a second multiplier 333, a digitizer (ADC) 331, a first low pass filter (LPF1) 336, a second low pass filter (LPF2) 353, a cartesian to polar coordinates converter 338, and a differentiator 339. Optionally, the beat note corrector 115 includes at least one of: a high pass filter (HPF) 351, a first block average 337, a second block average 354, a third low pass filter (LPF3) 351, and a fourth low pass filter (LPF4) 355.

The digitizer 331 is configured to receive the beat note electrical signal BNES from the beat note detector 114, and to digitize the beat note electrical signal BNES. The beat note electrical signal BNES is a data conveying signal whose data is extracted by the beat note corrector 115 using a reference signal. The subtractor 335 is configured to receive (from the CW resonance tracking loop 104) the resonant frequency in the CW direction (f1') of the optical resonator coil 165, to receive (from the CCW resonance tracking loop 103) the resonant frequency in the CCW direction (f2') of the optical resonator coil 165, and to subtract the latter from the former, i.e., f1'-f2'. This difference frequency, f1'-f2', is the reference frequency. In other embodiments, the difference frequency, and thus the reference frequency, is f2'-f1'; for pedagogical purposes, the difference frequency and reference frequency of f1'-f2' will be illustrated herein.

The NCO 334 is configured to receive the reference frequency and generate a sine function of the difference frequency (sin(f1'-f2')) and cosine function of the difference frequency (cos(f1'-f2')) thereof. The first multiplier 332 is configured to receive the sine function of the difference frequency and the digitized beat note electrical signal and to multiply the sine function with the digitized beat note electrical signal and generate a first mixing signal.[2] The second multiplier 333 is configured to receive the digitized beat note electrical signal and the cosine function and is further configured to multiply the cosine function with the digitized beat note electrical signal and generate a second mixing signal.[3]

[2] Optionally, the beat note corrector 315 includes the HPF 351 which is configured to remove any DC component from the digitized beat note electrical signal. When the HPF 351 is used, then the first multiplier 332 receives a high pass filtered, digitized beat note electrical signal.

[3] Optionally, the beat note corrector 315 includes the HPF 351 which is configured to remove any DC component from the digitized beat note electrical signal. When the HPF 351 is used, then the second multiplier 333 receives a high pass filtered, digitized beat note electrical signal.

The first low pass filter 336 is configured to receive the first mixing signal and further configured to generate a first low pass filtered signal in which power of all but the lowest frequency component of the first mixing signal is diminished in comparison to the lowest frequency component of the first mixing signal.[4] The second low pass filter 353 is configured to receive the second mixing signal and further configured to generate a second low pass filtered signal in which power of all but the lowest frequency component of the second mixing signal is diminished in comparison to the lowest frequency component of the second mixing signal.[5]

[4] Optionally, the beat note corrector 315 includes the first block average 337 which is configured to perform down sampling, i.e., reduce a bit rate, of the first low pass signal. When the first block average 337 is used, then the cartesian to polar coordinate converter 338 receives a first block averaged, low pass filtered signal.

[5] Optionally, the beat note corrector 315 includes the second block average 354 which is configured to perform down sampling, i.e., reduce a bit rate, of the second low pass signal. When the second block average 354 is used, then the cartesian to polar coordinate converter 338 receives a second block averaged, low pass filtered signal.

The first low pass filtered signal and the second low pass filtered signal respectively correspond to cartesian coordinate values, e.g., respectively an x-axis value and a y-axis value. The cartesian to polar coordinate converter 338 is configured to receive the first low pass filtered signal and the second low pass filtered signal and using such first and second low pass filtered signal to generate a phase signal θ. Optionally, the cartesian to polar coordinate converter 338 is implemented using a Coordinate Rotation Digital Computer (CORDIC) algorithm; however, any cartesian to polar coordinate converter algorithm may be used. If there is a difference in frequency between the difference frequency and the beat note electrical signal, then the phase signal θ changes over time. Optionally, the cartesian to polar coordinate converter 338 is also configured to generate an optional beat note radius signal (R) 356 which is an indicium of an amplitude of the beat note electronic signal (BNES) which, e.g., can be used for monitoring the level of the beat note electronic signal (BNES). The differentiator 339 is configured to receive the phase signal θ and to differentiate the phase signal (θ) with respect to time to generate a frequency which is also referred to as the beat note correction frequency δf.[6]

[6] Optionally, the beat note corrector includes a third low pass filter 351 electrically coupled to an output of the differentiator 339, configured to reduce noise in the beat note correction signal δf, and configured to provide a low pass filtered beat note correction signal δf at the output of the third low pass filter 351.

Returning to FIG. 1, the optional processing system 179 is coupled to the beat note corrector 115 and configured to receive the beat note correction frequency Sf from the beat note corrector 115. The optional processing system 179 is also coupled to the CW resonance tracking loop 103 and the CCW resonance tracking loop 103. The processing system is configured to receive the resonant frequency in the CW direction (f1') of the optical resonator coil 165 and the resonant frequency in the CCW direction (f2') of the optical resonator coil 165 respectively from the CW resonance tracking loop 104 and the CCW resonance tracking loop 103.

Using the beat note correction frequency δf, the resonant frequency in the CW direction (f1') of the optical resonator coil 165, and the resonant frequency in the CCW direction (f2') of the optical resonator coil 165, the optional processing system 179 is configured to determine the angular rate of rotation (Ω) 107 around the winding axis 108 of the optical resonator coil 165. The optional processing system 179, e.g., memory circuitry therein, may include program instructions which are executed by the optional processing system 179, e.g., processor circuitry therein, to determine the angular rate of rotation (Ω) 107 of the optical resonator coil 165 about the winding axis 108 of the optical resonator coil 165. The angular rate of rotation (Ω) 107 is a function (Δf) of (a) the difference frequency (f1'−f2' or f2'−f1' as discussed elsewhere herein) (b) that is offset by the beat note correction frequency &f. For purposes of clarity the offset may be implemented by subtracting or adding the beat note correction frequency δf from the difference. For pedagogical purpose, the function Δf may be implemented with the following function: f1'−f2'−δf; however, the function Δf may be implemented in alternative ways. Optionally, the angular rate of rotation, Ω, 107 around the winding axis 108 is equal to:

$$(\lambda * \Delta f * P)/(4 * A),$$

where λ is substantially equal to an average wavelength of the clockwise optical signal 161 and a counterclockwise optical signal 162, A is an area enclosed by the optical resonator coil 165, and P is the perimeter of the optical resonator path of the optical resonator coil 165 and resonator closure optics 118.

Figure 4:
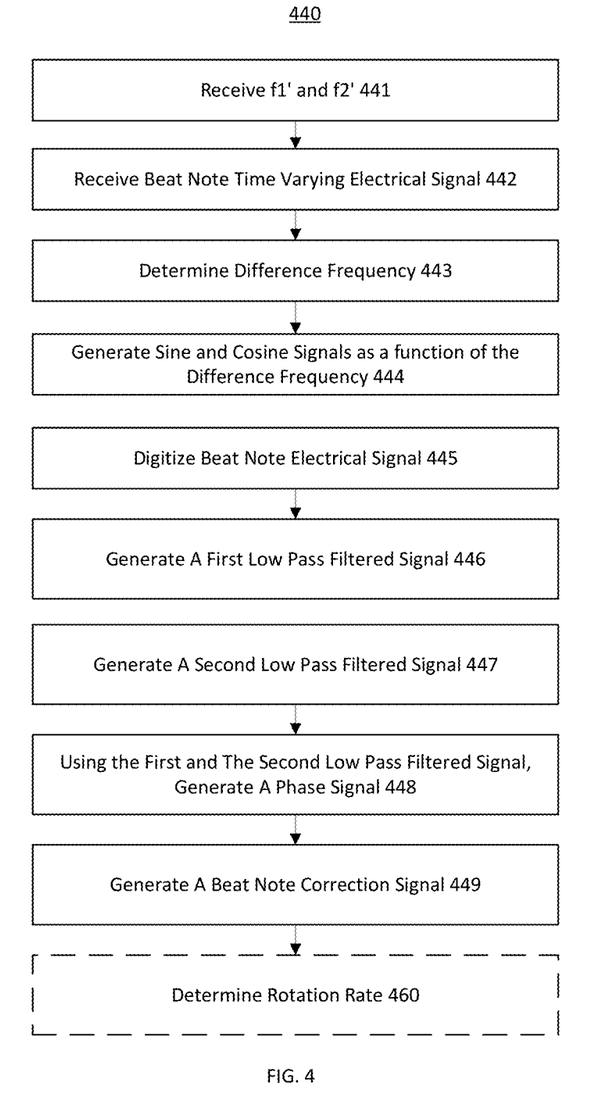
FIG. 4 illustrates a flow diagram of an exemplary method of determining a beat note correction signal.

FIG. 4 illustrates a flow diagram of an exemplary method 440 of determining a beat note correction signal δf in an RFOG. To the extent the method 440 shown in FIG. 4 is described herein as being implemented with one or more of the apparatuses illustrated in FIGS. 1-3, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner). Optionally, the method 440 is implemented with one or more of the apparatuses illustrated in FIGS. 1-3, e.g., at least in part in the beat note corrector (or beat note corrector circuit) 115. The method 440 is used to correct differential errors with respect to carrier frequencies f1 and f2.

In block 441, a resonant frequency in the CW direction (f1') of the optical resonator coil 165 and a resonant frequency in the CCW direction (f2') of the optical resonator coil 165 is received. In block 442, a beat note electrical signal (BNES) is received. The beat note electrical signal is derived from a portion of the clockwise optical signal and a portion of the counterclockwise optical signal, e.g., as further described elsewhere herein.

In block 443, a difference frequency, which is a function of f1' and f2', is determined. In block 444, a sine signal and a cosine signal as a function of the difference frequency is generated.

In block 445, the beat note electrical signal is digitized. Optionally, the digitized beat note electrical signal is high pass filtered.

In block 446, a first low pass filtered signal is generated by mixing the sine signal with the digitized beat note electrical signal, and removing mixing products other than a mixing product closest to zero Hertz (i.e., DC). Optionally, the first low pass filtered signal is block averaged to reduce a sampling rate of the first low pass filtered signal.

In block 447, a second low pass filtered signal is generated by mixing the cosine signal with the digitized beat note electrical signal, and removing mixing products other than a mixing product closest to zero Hertz (i.e., DC). Optionally, the first low pass filtered signal is block averaged to reduce a sampling rate of the second low pass filtered signal. In block 448, using the first and the second low pass filtered signals, a phase signal θ is generated, e.g., as described elsewhere herein.

In block 449, a beat note correction signal of is generated by differentiating the phase signal θ with respect to time. Optionally, the beat note correction signal δf is low pass filtered. Optionally, a beat note radius signal (R) 356, which is an indicium of an amplitude of the beat note electrical signal BNES, is generated, e.g., as described elsewhere herein. Thus, the beat note radius signal 356 may be used to monitor a level of the beat note electrical signal BNES. Optionally, the beat note radius signal (R) 356 is low pass filtered. In optional block 460, using the beat note correction signal and the difference frequency, a rate of rotation Ω 107 around the winding axis 108 of the optical resonator coil 165 is determined, e.g., as described elsewhere herein.

Optionally, blocks 441-460 are performed in the optional processing system 179. Alternatively and optionally, blocks 441-449 are performed in the beat note corrector 115 and optional block 460 is performed in the optional processing system 179. However, blocks of method 440 may be implemented differently in the beat note corrector 115 and the optional processing system 179, or may be performed in other apparatus(ses).

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium and executed by the processor circuitry. Generally, program modules or applications include routines, programs, objects, data components, data structures, algorithms, and the like, which perform particular tasks or implement particular abstract data types.

Techniques described herein may be implemented using a programmable circuit. e.g., an FPGA, that when loaded with data, stored in a non-transitory machine readable medium, causes the programmable circuit array to instantiate a circuit configured to implement such techniques.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected.

The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes a method for generating a beat note correction signal configured to reduce bias error in a resonant fiber optic gyroscope including an optical source optically coupled to an optical resonator coil, wherein the optical source is configured to generate a clockwise optical signal configured to propagate clockwise around the optical resonator coil and a counterclockwise optical signal configured to propagate counterclockwise around the optical resonator coil, the method comprising: receiving a resonant frequency in each of a clockwise direction and a counterclockwise direction of the optical resonator coil; receiving a beat note electrical signal derived from a portion of the clockwise optical signal and a portion of the counterclockwise optical signal; determining a difference frequency which is a function of the resonant frequency in the clockwise direction of the optical resonator coil and the resonant frequency in the counterclockwise direction of the optical resonator coil; generating (a) a sine signal which is a function of the difference frequency and (b) a cosine signal which is the function of the difference frequency; digitizing the beat note electrical signal; generating a first low pass filtered signal by mixing the sine signal with a digitized beat note electrical signal and removing first set of mixing products other than a first mixing product closest to zero Hertz; generating a second low pass filtered signal by mixing the cosine signal with the digitized beat note electrical signal and removing a second set of mixing products other than a second mixing product closest to zero Hertz; using the first and the second low pass filtered signals, generating a phase signal using a rectangular to polar coordinates converter; and generating the beat note correction signal by differentiating the phase signal with respect to time.

Example 2 includes the method of Example 1, further comprising, using the difference frequency and the beat note correction signal, determining a rate of rotation around a winding axis of the optical resonator coil.

Example 3 includes the method of any of Examples 1-2, further comprising low pass filtering the beat note correction signal.

Example 4 includes the method of any of Examples 1-3, further comprising high pass filtering the digitized beat note electrical signal to remove any direct current component; wherein the first low pass filtered signal and the second low pass filtered signal are generated using the digitized beat note electrical signal that has been high pass filtered.

Example 5 includes the method of any of Examples 1-4, further comprising reducing a sampling rate of each of the first low pass filtered signal and the second low pass filtered signal; wherein the phase signal is generated using the first and the second low pass filtered signals with a reduced sampling rate.

Example 6 includes the method of any of Examples 1-5, further comprising generating a beat note radius signal that is an indicium of an amplitude of the beat note electrical signal.

Example 7 includes a non-transitory machine readable medium storing data that when loaded into a programmable circuit, causes the programmable circuit to instantiate an instantiated circuit configured to generate a beat note correction signal configured to reduce bias error in a resonant fiber optic gyroscope including an optical source optically coupled to an optical resonator coil, wherein the optical source is configured to generate a clockwise optical signal configured to propagate clockwise around the optical resonator coil and a counterclockwise optical signal configured to propagate counterclockwise around the optical resonator coil, wherein the instantiated circuit is configured to: receive a resonant frequency in each of a clockwise direction and a counterclockwise direction of the optical resonator coil; receive a beat note electrical signal derived from a portion of the clockwise optical signal and a portion of the counterclockwise optical signal; determine a difference frequency which is a function of the resonant frequency in the clockwise direction of the optical resonator coil and the resonant frequency in the counterclockwise direction of the optical resonator coil; generate (a) a sine signal which is a function of the difference frequency and (b) a cosine signal which is the function of the difference frequency; digitize the beat note electrical signal; generate a first low pass filtered signal by mixing the sine signal with a digitized beat note electrical signal and removing a first set of mixing products other than a first mixing product closest to zero Hertz; generate a second low pass filtered signal by mixing the cosine signal with the digitized beat note electrical signal and removing a second set of mixing products other than a second mixing product closest to zero Hertz; using the first and the second low pass filtered signals, generate a phase signal using a rectangular to polar coordinates converter; and generate the beat note correction signal by differentiating the phase signal with respect to time.

Example 8 includes the non-transitory machine readable medium storing data of Example 7, wherein the instantiated circuit is further configured to, using the beat note correction signal and the difference frequency, determine a rate of rotation around a winding axis of the optical resonator coil.

Example 9 includes the non-transitory machine readable medium storing data of any of Examples 7-8, wherein the instantiated circuit is further configured to low pass filter the beat note correction signal.

Example 10 includes the non-transitory machine readable medium storing data of any of Examples 7-9, wherein the instantiated circuit is further configured to high pass filter the digitized beat note electrical signal to remove any direct current component; wherein the first low pass filtered signal and the second low pass filtered signal are generated using the digitized beat note electrical signal that has been high pass filtered.

Example 11 includes the non-transitory machine readable medium storing data of any of Examples 7-10, wherein the instantiated circuit is further configured to reduce a sampling rate of each of the first low pass filtered signal and the second low pass filtered signal; wherein the phase signal is generated using the first and the second low pass filtered signals with a reduced sampling rate.

Example 12 includes the non-transitory machine readable medium storing data of any of Examples 7-11, wherein the instantiated circuit is further configured to generate a beat note radius signal that is an indicium of an amplitude of the beat note electrical signal.

Example 13 includes a resonant fiber optic gyroscope (RFOG), comprising: an optical source comprising at least one laser and configured to generate a clockwise (CW) optical signal and a counterclockwise optical (CCW) signal; a beat note detector configured to receive a first portion of the CW optical signal and a first portion of the CCW optical signal, and to generate a beat note electrical signal using the first portions of the CW and the CCW optical signals; an optical resonator coil; resonator closure optics configured to couple a second portion of the CW optical signal and a second portion of the CW optical signal into the optical resonator coil, and to transmit a third portion of the CW optical signal and a third portion of the CCW optical signal from the optical resonator coil; a CW rate detector configured to convert a portion of the third portion of the CW optical signal to a CW electrical signal; a CCW rate detector configured to convert a portion of the third portion of the CCW optical signal to a CCW electrical signal; a CW resonance tracking loop circuit configured to determine a resonant frequency of the optical resonator coil in a CW direction; a CCW resonance tracking loop circuit configured to determine a resonant frequency of the optical resonator coil in a CCW direction; and first circuitry configured to: receive the resonant frequency in each of a clockwise direction and a counterclockwise direction of the optical resonator coil; receive the beat note electrical signal; determine a difference frequency which is a function of the resonant frequency in the clockwise direction of the optical resonator coil and the resonant frequency in the counterclockwise direction of the optical resonator coil; generate (a) a sine signal which is a function of the difference frequency and (b) a cosine signal which is the function of the difference frequency; digitize the beat note electrical signal; generate a first low pass filtered signal by mixing the sine signal with a digitized beat note electrical signal and removing a first set of mixing products other than a first mixing product closest to zero Hertz; generate a second low pass filtered signal by mixing the cosine signal with a digitized beat note electrical signal and removing a second set of mixing products other than a second mixing product closest to zero Hertz; using the first and the second low pass filtered signals, generate a phase signal using a rectangular to polar coordinates converter; and generate a beat note correction signal by differentiating the phase signal with respect to time.

Example 14 includes the RFOG of Example 13, wherein the first circuitry is further configured to, using the beat note correction signal and the difference frequency, determine a rate of rotation around a winding axis of the optical resonator coil.

Example 15 includes the RFOG of any of Examples 13-14, wherein the first circuitry is further configured to low pass filter the beat note correction signal.

Example 16 includes the RFOG of any of Examples 13-15, wherein the first circuitry is further configured to high pass filter the digitized beat note electrical signal to remove any direct current component; wherein the first low pass filtered signal and the second low pass filtered signal are generated using the digitized beat note electrical signal that has been high pass filtered.

Example 17 includes the RFOG of any of Examples 13-16, wherein the circuitry is further configured to reduce a sampling rate of each of the first low pass filtered signal and the second low pass filtered signal; wherein the phase signal is generated using the first and the second low pass filtered signals with a reduced sampling rate.

Example 18 includes the RFOG of any of Examples 13-17, wherein the first circuitry is further configured to generate a beat note radius signal that is an indicium of an amplitude of the beat note electrical signal.

Example 19 includes the RFOG of any of Examples 13-18, wherein the optical source comprises two lasers.

Example 20 includes the RFOG of any of Examples 13-19, wherein the first circuitry comprises a beat note corrector and a processing system.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for generating a beat note correction signal configured to reduce bias error in a resonant fiber optic gyroscope including an optical source optically coupled to an optical resonator coil, wherein the optical source is configured to generate a clockwise optical signal configured to propagate clockwise around the optical resonator coil and a counterclockwise optical signal configured to propagate counterclockwise around the optical resonator coil, the method comprising:
    receiving a resonant frequency in each of a clockwise direction and a counterclockwise direction of the optical resonator coil;
    receiving a beat note electrical signal derived from a portion of the clockwise optical signal and a portion of the counterclockwise optical signal;
    determining a difference frequency which is a function of the resonant frequency in the clockwise direction of the optical resonator coil and the resonant frequency in the counterclockwise direction of the optical resonator coil;
    generating (a) a sine signal which is a function of the difference frequency and (b) a cosine signal which is the function of the difference frequency;
    digitizing the beat note electrical signal;
    generating a first low pass filtered signal by mixing the sine signal with a digitized beat note electrical signal and removing first set of mixing products other than a first mixing product closest to zero Hertz;
    generating a second low pass filtered signal by mixing the cosine signal with the digitized beat note electrical signal and removing a second set of mixing products other than a second mixing product closest to zero Hertz;
    using the first and the second low pass filtered signals, generating a phase signal using a rectangular to polar coordinates converter; and
    generating the beat note correction signal by differentiating the phase signal with respect to time.

2. The method of claim 1, further comprising, using the difference frequency and the beat note correction signal, determining a rate of rotation around a winding axis of the optical resonator coil.

3. The method of claim 1, further comprising low pass filtering the beat note correction signal.

4. The method of claim 1, further comprising high pass filtering the digitized beat note electrical signal to remove any direct current component;
    wherein the first low pass filtered signal and the second low pass filtered signal are generated using the digitized beat note electrical signal that has been high pass filtered.

5. The method of claim 1, further comprising reducing a sampling rate of each of the first low pass filtered signal and the second low pass filtered signal;
    wherein the phase signal is generated using the first and the second low pass filtered signals with a reduced sampling rate.

6. The method of claim 1, further comprising generating a beat note radius signal that is an indicium of an amplitude of the beat note electrical signal.

7. A non-transitory machine readable medium storing data that when loaded into a programmable circuit, causes the programmable circuit to instantiate an instantiated circuit configured to generate a beat note correction signal configured to reduce bias error in a resonant fiber optic gyroscope including an optical source optically coupled to an optical resonator coil, wherein the optical source is configured to generate a clockwise optical signal configured to propagate clockwise around the optical resonator coil and a counterclockwise optical signal configured to propagate counterclockwise around the optical resonator coil, wherein the instantiated circuit is configured to:
    receive a resonant frequency in each of a clockwise direction and a counterclockwise direction of the optical resonator coil;
    receive a beat note electrical signal derived from a portion of the clockwise optical signal and a portion of the counterclockwise optical signal;
    determine a difference frequency which is a function of the resonant frequency in the clockwise direction of the optical resonator coil and the resonant frequency in the counterclockwise direction of the optical resonator coil;
    generate (a) a sine signal which is a function of the difference frequency and (b) a cosine signal which is the function of the difference frequency;
    digitize the beat note electrical signal;
    generate a first low pass filtered signal by mixing the sine signal with a digitized beat note electrical signal and removing a first set of mixing products other than a first mixing product closest to zero Hertz;
    generate a second low pass filtered signal by mixing the cosine signal with the digitized beat note electrical signal and removing a second set of mixing products other than a second mixing product closest to zero Hertz;
    using the first and the second low pass filtered signals, generate a phase signal using a rectangular to polar coordinates converter; and
    generate the beat note correction signal by differentiating the phase signal with respect to time.

8. The non-transitory machine readable medium storing data of claim 7, wherein the instantiated circuit is further configured to, using the beat note correction signal and the difference frequency, determine a rate of rotation around a winding axis of the optical resonator coil.

9. The non-transitory machine readable medium storing data of claim 7, wherein the instantiated circuit is further configured to low pass filter the beat note correction signal.

10. The non-transitory machine readable medium storing data of claim 7, wherein the instantiated circuit is further configured to high pass filter the digitized beat note electrical signal to remove any direct current component;
wherein the first low pass filtered signal and the second low pass filtered signal are generated using the digitized beat note electrical signal that has been high pass filtered.

11. The non-transitory machine readable medium storing data of claim 7, wherein the instantiated circuit is further configured to reduce a sampling rate of each of the first low pass filtered signal and the second low pass filtered signal;
wherein the phase signal is generated using the first and the second low pass filtered signals with a reduced sampling rate.

12. The non-transitory machine readable medium storing data of claim 7, wherein the instantiated circuit is further configured to generate a beat note radius signal that is an indicium of an amplitude of the beat note electrical signal.

13. A resonant fiber optic gyroscope (RFOG), comprising:
an optical source comprising at least one laser and configured to generate a clockwise (CW) optical signal and a counterclockwise optical (CCW) signal;
a beat note detector configured to receive a first portion of the CW optical signal and a first portion of the CCW optical signal, and to generate a beat note electrical signal using the first portions of the CW and the CCW optical signals;
an optical resonator coil;
resonator closure optics configured to couple a second portion of the CW optical signal and a second portion of the CW optical signal into the optical resonator coil, and to transmit a third portion of the CW optical signal and a third portion of the CCW optical signal from the optical resonator coil;
a CW rate detector configured to convert a portion of the third portion of the CW optical signal to a CW electrical signal;
a CCW rate detector configured to convert a portion of the third portion of the CCW optical signal to a CCW electrical signal;
a CW resonance tracking loop circuit configured to determine a resonant frequency of the optical resonator coil in a CW direction;
a CCW resonance tracking loop circuit configured to determine a resonant frequency of the optical resonator coil in a CCW direction; and
first circuitry configured to:
receive the resonant frequency in each of a clockwise direction and a counterclockwise direction of the optical resonator coil;
receive the beat note electrical signal;
determine a difference frequency which is a function of the resonant frequency in the clockwise direction of the optical resonator coil and the resonant frequency in the counterclockwise direction of the optical resonator coil;
generate (a) a sine signal which is a function of the difference frequency and (b) a cosine signal which is the function of the difference frequency;
digitize the beat note electrical signal;
generate a first low pass filtered signal by mixing the sine signal with a digitized beat note electrical signal and removing a first set of mixing products other than a first mixing product closest to zero Hertz;
generate a second low pass filtered signal by mixing the cosine signal with a digitized beat note electrical signal and removing a second set of mixing products other than a second mixing product closest to zero Hertz;
using the first and the second low pass filtered signals, generate a phase signal using a rectangular to polar coordinates converter; and
generate a beat note correction signal by differentiating the phase signal with respect to time.

14. The RFOG of claim 13, wherein the first circuitry is further configured to, using the beat note correction signal and the difference frequency, determine a rate of rotation around a winding axis of the optical resonator coil.

15. The RFOG of claim 13, wherein the first circuitry is further configured to low pass filter the beat note correction signal.

16. The RFOG of claim 13, wherein the first circuitry is further configured to high pass filter the digitized beat note electrical signal to remove any direct current component;
wherein the first low pass filtered signal and the second low pass filtered signal are generated using the digitized beat note electrical signal that has been high pass filtered.

17. The RFOG of claim 13, wherein the circuitry is further configured to reduce a sampling rate of each of the first low pass filtered signal and the second low pass filtered signal;
wherein the phase signal is generated using the first and the second low pass filtered signals with a reduced sampling rate.

18. The RFOG of claim 13, wherein the first circuitry is further configured to generate a beat note radius signal that is an indicium of an amplitude of the beat note electrical signal.

19. The RFOG of claim 13, wherein the optical source comprises two lasers.

20. The RFOG of claim 13, wherein the first circuitry comprises a beat note corrector and a processing system.

* * * * *